Patented June 8, 1943

2,321,364

UNITED STATES PATENT OFFICE 2,321,364

REACTION PRODUCTS OF ALDEHYDES AND DIAZINE DERIVATIVES

Gaetano F. D'Alelio, Pittsfield, Mass., assignor to General Electric Company, a corporation of New York No Drawing. Application November 14, 1941, Serial No. 419,178

20 Claims. (Cl. 260—72)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and an organic compound corresponding to the following general formula:

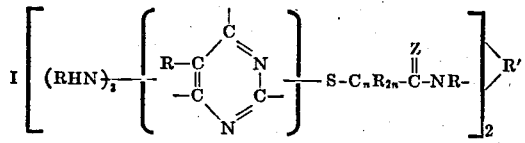

In the above formula $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, and R' represents a member of the class consisting of divalent hydrocarbon and substituted hydrocarbon radicals, more particularly halo-hydrocarbon radicals. Since $n$ represents an integer which is 1 or 2, it will be seen that the linkage of the sulfur atom to the carbamyl-alkyl or thionocarbamyl-alkyl grouping in all cases will be alpha or beta to the carbamyl or thionocarbamyl grouping. It also will be observed that the amino (—NHR) groups and the sulfur atom are attached directly to a carbon atom of the pyrimidine nucleus.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in the above formula is hydrogen. Also especially suitable for use in carrying the present invention into effect are organic compounds corresponding to the general formulas:

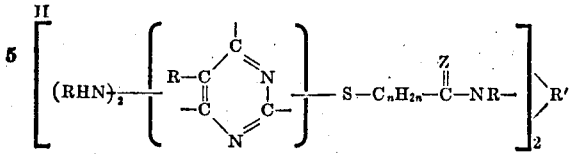

and, more particularly,

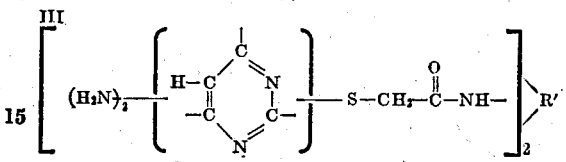

where $n$, Z, R and R' have the same meanings as given above with particular reference to Formula I.

Illustrative examples of divalent radicals that R' in the above formulas may represent are divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aromatic-substituted aliphatic or divalent aliphatic-substituted aromatic, e. g., 4, alpha-tolylene, 3, beta-phenyleneethyl, 4, alpha-xylylene, 2, gamma-phenylenebutyl, etc.; and their homologues, as well as those divalent radicals with one or more of their hydrogen atoms replaced by a substituent, e. g., halogeno, amino, acetyl, acetoxy, carboalkoxy, alkoxy, aryloxy, hydroxy, alkyl, alkenyl, etc . Specific examples of substituted divalent radicals are chloroethylene, chloropropylene, bromobutylene, chlorophenylene, chlorotolylene, bromophenylene, chloronaphthylene, bromonaphthylene, bromo 1,4-tolylene, chlorocyclopentylene, chloropentenylene, carbomethoxyphenylene, ethoxyphenylene, acetophenylene, acetoxyphenylene, bromocyclopentylene, aminophenylene, phenoxyphenylene, methylphenylene (tolylene), allylphenylene, etc. Preferably R' is ethylene, phenylene or tolylene.

Instead of the diamino [(—NHR)₂] pyrimidine (1,3-diazine) derivatives, corresponding derivatives of the 1,2-diazines (pyridazines) or of the 1,4-diazines (pyrazines) may be used. Also, instead of using compounds wherein there is only one thio linkage connecting the diazine nucleus with the alkylamido or alkylthionoamido grouping, I may use compounds wherein there are two or three sulfur atoms connecting the diazine nucleus with two or three, respectively, alkylamido or alkylthionoamido groupings.

The diazine derivatives that are used in carrying the present invention into effect are more fully described and are specifically claimed in my copending application Serial No. 419,177, filed November 14, 1941, now Patent No. 2,312,695, issued March 2, 1943, and assigned to the same assignee as the present invention.

Specific examples of bis-(diazinyl thio alkylamido) and bis-(diazinyl thio alkylthionoamido) derivatives of divalent hydrocarbons that may be used in producing my new condensation products are listed below:

Bis-(diamino pyrimidyl thio acetamido) ethane, more particularly alpha, beta-bis-(4,6-diamino pyrimidyl-2 thio acetamido) ethane and alpha, beta-bis-(2,6-diamino pyrimidyl-4 thio acetamido) ethane Bis-(diamino pyrimidyl thio acetothionoamido) ethane, more particularly alpha, beta-bis-(4,6-diamino pyrimidyl-2 thio acetothionoamido) ethane and alpha, beta-bis-(2,6-diamino pyrimidyl-4 thio acetothionoamido) ethane Bis-(diamino pyrimidyl thio acetamido) propanes, including the bis-(4,6-diamino pyrimidyl-2 thio acetamido) propanes and the bis-(2,6-diamino pyrimidyl-4 thio acetamido) propanes Bis-(diamino pyrimidyl thio acetothionoamido) propanes, including the bis-(4,6-diamino pyrimidyl-2 thio acetothionamido) propanes and the bis-(2,6-diamino pyrimidyl-4 thio acetothionoamido propanes Bis-(diamino pyrimidyl thio acetamido) butanes Bis-(diamino-pyrimidyl thio acetamido) pentanes Bis-(diamino pyrimidyl thio acetamido) benzenes Bis-(diamino pyrimidyl thio acetamido) toluenes Bis-(diamino pyrimidyl thio acetamido) xylenes Bis-(diamino pyrimidyl thio acetamido) naphthalenes Bis-(diamino pyrimidyl thio acetamido) chlorobenzenes Bis-(diamino pyrimidyl thio acetamido) octanes Bis-(diamino pyrimidyl thio acetamido) chloronaphthalenes Bis-(diamino pyrimidyl thio acetamido) chlorobutanes Bis-(diamino pyrimidyl thio acetothionoamido) butanes Bis-(diamino pyrimidyl thio acetothionoamido) benzenes Bis-(diamino pyrimidyl thio acetothionoamido) toluenes Bis-(diamino pyrimidyl alpha-thio propanthionoamido) benzenes Bis-(diamino pyrimidyl beta-thio propanthionoamido benzenes Bis-(diamino pyrimidyl alpha-thio propanthionoamido) toluenes Bis-(diamino pyrimidyl beta-thio propanthionoamido) toluenes Alpha, gamma-bis-(4-chloroethylamino 6-methylamino pyrimidyl-2 thio methyl N-methyl acetamido) propene 2,4-bis-(4'-chlorocyclohexylamino 5'-phenyl-isopropyl 6'-amino pyrimidyl-2' thio cyclopentyl acetothionoamido) chlorotoluene Bis-(4-chloroxenylamino 6-amino pyrimidyl-2 thio ethyl xylyl N-phenyl acetamido) cyclohexanes.

Bis-(diamino pyrimidyl thio acetamido) ethylbenzenes

Alpha, beta-bis-(diamino pyrimidyl alpha-thiopropanamido) ethanes, including alpha, beta-bis-(4,6-diamino pyrimidyl-2 alpha-thio propanamido) ethane and alpha, beta-bis-(2,6-diamino pyrimidyl-4 alpha-thio propanamido) ethane Alpha, beta-bis-(diamino pyrimidyl betha-thio propanamido (ethanes, including alpha, beta-bis-(4,6-diamino pyrimidyl-2 beta-thio propanamido) ethane and alpha, beta-bis-(2,6-diamino pyrimidyl-4 beta-thio) ethane Alpha, beta-bis-(diamino pyrimidyl alpha-thio propanthionoamido) ethanes, including alpha, beta-bis-(4,6-diamino pyrimidyl-2 alpha-thio propanthionoamido) ethane and alpha, beta-bis-(2,6-diamino pyrimidyl-4 alpha-thio propanthionoamido) ethane Alpha, beta-bis-(diamino pyrimidyl beta-thio propanthionoamido) ethanes, including alpha, beta-bis-(2,6-diamino pyrimidyl-4 beta thio propanthionoamido) ethane and alpha, beta-bis-(4,6-diamino pyrimidyl-2 beta thio propanthionoamido) ethane Bis-(diamino pyrimidyl alpha-thio propanamido) propanes Bis-(diamino pyrimidyl beta-thio propanamido) propanes Bis-(diamino pyrimidyl alpha-thio propanamido) butanes Bis-(diamino pyrimidyl beta-thio propanamido) butanes Bis-(diamino pyrimidyl alpha-thio propanamido) pentanes Bis-(diamino pyrimidyl beta-thio propanamido) pentanes Bis-(diamino pyrimidyl alpha-thio propanamido) benzenes Bis-(diamino pyrimidyl beta-thio propanamido) benzenes Bis-(diamino pyrimidyl alpha-thio propanamido) toluenes Bis-(diamino pyrimidyl beta-thio propanamido) toluenes Bis-(diamino pyrimidyl alpha-thio propanamido) xylenes Bis-(diamino pyrimidyl beta-thio propanamido) xylenes Bis-(diamino pyrimidyl alpha-thio propanamido) ethylbenzenes Bis-(diamino pyrimidyl beta-thio propanamido) ethylbenzenes Bis-(diamino pyrimidyl alpha-thio propanamido) naphthalenes Bis-(diamino pyrimidyl alpha-thio propanamido) chloronaphthalenes Bis-(diamino pyrimidyl beta-thio propanamido) naphthalenes Bis-(diamino pyrimidyl beta-thio propanamido) chloronaphthalenes Bis-(diamino pyrimidyl alpha-thio propanamido) chlorobenzenes Bis-(diamino pyrimidyl beta-thio propanamido) chlorobenzenes Bis-(diamino pyrimidyl alpha-thio propanamido) octanes Bis-(diamino pyrimidyl beta-thio propanamido) octanes Bis-(diamino pyrimidyl alpha-thio propanamido) chlorobutanes Bis-(diamino pyrimidyl betha-thio propanamido) chlorobutanes Additional examples of compounds that may be used as starting reactants in producing the new condensation products of the present invention are given in my above-identified copending application.

It will be understood, of course, by those skilled in the art that, in those compounds listed above that are generically named, the diamino pyrimidyl thio alkylamido (or alkylthionoamido) substituents may be attached to any two positions in the hydrocarbon or halo-hydrocarbon nucleus. It also will be understood that the expression "diamino pyrimidyl" includes both the 4,6-diamino pyrimidyl-2 and the 2,6-diamino pyrimidyl-4 (2,4-diamino pyrimidyl-6) derivatives.

The present invention is based on my discovery that new and valuable materials of particular utility in the plastics and coating arts can be produced by effecting reaction between ingredients comprising essentially an aldehyde, including polymeric aldehydes and aldehyde-addition products, and certain bis-(diazinyl thio alkylamido) and bis-(diazinyl thio alkylthionoamido) derivatives of divalent hydrocarbons, numerous examples of which have been given above and in my above-identified copending application.

Resins heretofore have been made by condensing an aldehyde with certain aminopyrimidine thioethers, but such known resins are not entirely satisfactory for some applications. The present invention provides resinous compositions having superior properties to the known aminopyrimidine thioether-aldehyde resinous condensation products and having wider fields of utility.

In practicing my invention the initial condensation reaction may be carried out at normal or at elevated temperatures, at atmospheric, subatmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivative, e. g., ketones, urea ($NH_2CONH_2$), thiourea, selenourea, iminourea (guanidine), substituted ureas, thioureas, selenoureas and iminoureas, numerous examples of which are given in various copending applications of mine, for instance in my copending application Serial No. 363,037, filed October 26, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, numerous other examples being given in various copending applications of mine, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the diazine derivative and the aldehyde by mixing all the reactants and effecting condensation therebetween or by various permutations of reactants as described, for example, in my copending application Serial No. 363,037 with particular reference to reactions involving a urea, an aldehyde and oxanilic acid. For instance, I may form a partial condensation product of ingredients comprising (1) urea or melamine or urea and melamine, (2) a diazine derivative of the kind herein described, for example an alpha, beta-bis (diamino pyrimidyl thio acetamido) ethane, and (3) an aldehyde, including polymeric aldehydes and aldehyde-addition products, for instance formaldehyde, paraformaldehyde, dimethylol urea, a polymethylol melamine, e. g., hexamethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have good surface finish and excellent resistance to water and arcing.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents, e. g., alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| Alpha, beta-bis-(4,6-diamino pyrimidyl-2 thio acetamido) ethane | 42.4 |
| Aqueous formaldehyde (approx. 37.1% HCHO) | 48.6 |
| Aqueous ammonia (approx. 28% NH₃) | 2.5 |
| Sodium hydroxide solution (0.46 N) | 1.5 |
| Water | 20.0 |
| Chloroacetamide (monochloroacetamide) | 0.2 |

All of the above components with the exception of the chloroacetamide (a curing reactant) were heated together under reflux at the boiling temperature of the mass for 5 minutes, yielding a gelled mass. The chloroacetamide was incorporated into the gelled resin, which thereafter was allowed to dry at room temperature until sufficient water had been removed to yield a product that could be molded satisfactorily. A cured molded piece having a translucent appearance was produced by molding a sample of the dried and ground resin under pressure for 5 minutes at a temperature of 140° C.

*Example 2*

| | Parts |
|---|---|
| Alpha, beta-bis-(4,6-diamino pyrimidyl-2 thio acetamido) ethane | 21.2 |
| Urea | 30.0 |
| Aqueous formaldehyde (approx. 37.1% HCHO) | 72.9 |
| Aqueous ammonia (approx. 28% NH₃) | 3.5 |
| Sodium hydroxide solution (0.46 N) | 1.7 |
| Water | 20.0 |
| Chloroacetamide | 0.3 |

All of the above components with the exception of the chloroacetamide were heated together under reflux at the boiling temperature of the mass for 10 minutes. At the end of this period of time a resinous precipitate had begun to form. The chloroacetamide was now added and the hot resinous syrup was mixed with 43.2 parts alpha cellulose in flock form and 0.2 part of a mold lubricant, specifically zinc stearate, to form a molding (moldable) composition. The wet molding compound was dried at room temperature until sufficient moisture had been removed to yield a product that could be molded satisfactorily. A sample of the dried and ground composition was pressed into the form of a disk at a temperature of 140° C. and under a pressure of 4,500 pounds per square inch, using a molding time of 5 minutes. The molded disk was pulled hot from the mold and did not become distorted upon cooling to room temperature. The molded piece was well cured throughout and had a well-knit and homogeneous structure. The molding compound showed good flow characteristics during molding. The molded disk had excellent water resistance, as shown by the fact that when it was immersed in boiling water for 15 minutes and then in cold water for 5 minutes, it absorbed only 0.85% by weight of water. When the ordinary urea-formaldehyde resins are used in the production of molding compounds, molded disks made therefrom show from 5 to 7% by weight of water absorbed when similarly tested for water-resistance characteristics. Thus it is seen that, although the pyrimidine derivative is employed only in an amount corresponding to about 0.1 mol thereof per mol of urea, its use provides molded products which are much more resistant to water than molded products obtained when the conventional urea-formaldehyde resins are employed.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.) or by intercondensation with curing reactants other than monochloroacetamide (e. g., di- and tri-chloroacetamides, chloroacetonitriles, alpha, beta - dibromopropionitrile, aminoacetamide hydrochloride, aminoacetonitrile hydrochloride, ethylene diamine monohydrochloride, ethanolamine hydrochlorides, nitrourea, chloroacetyl urea, chloroacetone, glycine, sulfamic acid, citric diamide, phenacyl chloride, etc.). Other examples of active and latent curing catalysts and of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention.

*Example 3*

| | Parts |
|---|---|
| Alpha, beta-bis-(4,6-diamino pyrimidyl-2 thio acetamido) ethane | 12.7 |
| Melamine | 37.8 |
| Aqueous formaldehyde (approx. 37.1% HCHO) | 81.0 |
| Aqueous ammonia (approx. 28% NH₃) | 1.9 |
| Sodium hydroxide solution (0.46 N) | 2.2 |
| Chloroacetamide | 0.3 |

All of the above components with the exception of the chloroacetamide were heated together under reflux at boiling temperature for 10 minutes. The chloroacetamide was now added and refluxing was continued for an additional 5 minutes to cause the chloroacetamide to intercondense with the partial condensation product of the melamine, pyrimidine derivative and formaldehyde. A molding composition was made from the resulting resinous syrup by mixing therewith 45.3 parts alpha cellulose in flock form and 0.2 part zinc stearate. The wet compound was dried at room temperature as described in the preceding examples. A well-cured molded piece was produced by molding a sample of the dried and ground compound for 3½ minutes at 140° C. under a pressure of 4,500 pounds per square inch. Instead of chloroacetamide, other curing agents such as mentioned under Example 2 may be employed.

*Example 4*

A phenol-formaldehyde liquid partial condensation product was prepared by heating together 90 parts phenol and 195 parts of an aqueous formaldehyde solution containing approximately 37.1% HCHO for 4 hours at 65° to 70° C., using 2.85 parts of potassium carbonate as a catalyst for the reaction. This partial condensation product is described in the following formula as "phenolic resin syrup":

| | Parts |
|---|---|
| Phenolic resin syrup | 60.0 |
| Alpha, beta-bis-(4,6-diamino pyrimidyl-2 thio acetamido) ethane | 12.7 |
| Sodium hydroxide solution (0.46 N) | 1.0 |
| Oxalic acid | 1.1 |

All of the above components with the exception of the oxalic acid were heated together under reflux for 10 minutes. The oxalic acid, dissolved in a small amount of water, was now added to the reaction mass. The resulting mixture was compounded immediately with 25 parts alpha cellulose and 0.1 part zinc stearate. The wet molding composition thereby produced was dried at room temperature until sufficient moisture had been removed to yield a molding compound that could be molded satisfactorily. A sample of the dried and ground molding composition was molded into the form of a disk at 140° C. under a pressure of 4,500 pounds per square inch, using a molding time of 10 minutes. The molded piece was well cured throughout and possessed a well-knit and homogeneous structure. The molding compound showed good flow characteristics during molding. The molded disk had excellent water resistance as evidenced by the fact that, when tested for its water-resistance characteristics as described under Example 2, it absorbed only 0.69% by weight of water.

*Example 5*

| | Parts |
|---|---|
| Alpha, beta-bis-(4,6-diamino pyrimidyl-2 thio acetamido) ethane | 21.2 |
| Sulfanilamide | 8.6 |
| Aqueous formaldehyde (approx. 37.1% HCHO) | 40.5 |
| Water | 20.0 |
| Sodium hydroxide solution (0.46 N) | 2.0 |
| Chloroacetamide | 0.2 |

The above ingredients were mixed together and then heated under reflux at boiling temperatures for several minutes. The resin that precipitated from the reaction mass was mixed with 24.2 parts alpha cellulose and 0.1 part zinc stearate. The resulting paste was mixed and ground until homogeneous, and thereafter was dried at room temperature as described in the previous examples. The dried mixture of resin and filler was ground to a fine powder. A sample of the powdered molding compound was molded into the form of a disk at 140° C. and a pressure of 4,500 pounds per square inch, using a molding time of 5 minutes. The disk was pulled hot from the mold. It did not become distorted upon cooling to room temperature. It was well cured throughout and had a well-knit and homogeneous structure. The molding compound showed good plastic flow during molding. The molded disk had good water resistance, as shown by the fact that it absorbed only 1.95% by weight of water when tested for its water-resistance characteristics as described under Example 2.

*Example 6*

| | Parts |
|---|---|
| Alpha, beta-bis-(4,6-diamino pyrimidyl-2 thio acetamido) ethane | 12.7 |
| Thiourea | 22.8 |
| Aqueous formaldehyde (approx. 37.1% HCHO) | 56.7 |
| Aqueous ammonia (approx. 28% NH₃) | 4.0 |
| Sodium hydroxide solution (0.46 N) | 2.0 |
| Chloroacetamide | 0.4 |

All of the above ingredients with the exception of the chloroacetamide were heated together under reflux at the boiling temperature of the mass for 14 minutes. The chloroacetamide was now added and refluxing was continued for an additional 1 minute. The resulting resinous syrup was mixed with 33 parts alpha cellulose and 0.2 part zinc stearate to form a molding compound. The wet molding composition was dried at room temperature as in the preceding examples. A well-cured molded piece was produced by molding a sample of the dried and ground molding compound for 5 minutes at 140° C. under a pressure of 4,500 pounds per square inch. The molded article had good water resistance, as evidenced by the fact that it absorbed only 2.04% by weight of water when tested for water resistance as described under Example 2. Instead of chloroacetamide, other curing agents such as mentioned under Example 2 may be employed.

An unexpected result in the use of bis-(diamino pyrimidyl thio alkylamido) or bis-(diamino pyrimidyl thio alkylthionoamido) derivatives of divalent hydrocarbons in conjunction with urea, thiourea, sulfanilamide and other modifying reactants in the production of condensation products thereof with aldehydes is that the pyrimidyl derivative materially lessens the condensation time otherwise required to obtain a syrup of desired properties and, also, improves the curing and water-resistance characteristics of the resin without detrimental effect upon other desirable properties such as moldability and flow characteristics during molding.

*Example 7*

| | Parts |
|---|---|
| Alpha, beta-bis-(4,6-diamino pyrimidyl-2 thio acetamido) ethane | 21.2 |
| Furfural | 151.5 |
| Aqueous ammonia (approx. 28% NH₃) | 1.5 |
| Sodium hydroxide solution (0.46 N) | 0.8 |

The above ingredients were heated together under reflux at boiling temperature for 15 minutes, yielding a clear, dark-colored resinous syrup. The syrupy condensation product was tested for its curing characteristics by treating small samples of it with various curing agents and heating the resulting mixture on a 140° C. hotplate. Chloroacetamide, glycine, sulfamic acid, polysalicylide, sodium chloroacetate and other curing agents such as mentioned under Example 2 were employed. These agents caused the resinous syrup to convert rapidly at 140° C. to a cured or insoluble and infusible state. The cured resins could be removed from a 140° C. hotplate in thin sheet form having good cohesive characteristics. The resinous composition of this example may be used in the production of molding compositions or as modifiers of other synthetic resins.

*Example 8*

| | Parts |
|---|---|
| Alpha, beta-bis-(4,6-diamino pyrimidyl-2 thio acetamido) ethane | 21.2 |
| Acrolein | 16.8 |
| Water | 50.0 |
| Sodium hydroxide solution (0.46 N) | 0.8 | were heated together under reflux at the boiling temperature of the mass for 10 minutes. This resinous material was potentially heat-curable as shown by the fact that, when small samples of it were mixed with such curing agents as glycine, sulfamic acid, chloroacetamide, alpha, beta-dibromopropionitrile, polysalicylide, chloroacetyl urea and other curing agents such as mentioned under Example 2, followed by heating on a 140° C. hotplate, the resinous mass was converted to an infusible solid. The resinous material of this example would be suitable for use in the production of molding compositions.

*Example 9*

| | Parts |
|---|---|
| Alpha, beta-bis-(4,6-diamino pyrimidyl-2 thio acetamido) ethane | 21.2 |
| Butyl alcohol | 37.0 |
| Aqueous formaldehyde (approx. 37.1% HCHO) | 40.5 |
| Sodium hydroxide solution (0.46 N) | 0.8 | were heated together under reflux at the boiling temperature of the mass for 8 minutes, yielding a clear syrup which was dehydrated by heating it on a steamplate. The resinified mass was soluble in ethyl alcohol, benzyl alcohol, ethylene glycol, butyl alcohol, Cellosolve and in other organic solvents. A sample of the dissolved resin was applied to a glass plate, which thereafter was baked for several hours at 70° C. A hard, smooth, water-white, water-resistant, glossy, baked film was formed on the plate.

The resinous composition of this example may be used in the manufacture of spirit and baking varnishes. It also may be used as a modifier of varnishes of the aminoplast and alkyd-resin types.

*Example 10*

| | Parts |
|---|---|
| Alpha, beta-bis-(4,6-diamino pyrimidyl-2 thio acetamido) ethane | 21.2 |
| Acetamide | 2.9 |
| Aqueous formaldehyde (approx. 37.1% HCHO) | 40.5 |
| Aqueous ammonia (approx. 28% NH₃) | 1.5 |
| Sodium hydroxide solution (0.46 N) | 0.8 | were heated together under reflux at the boiling temperature of the mass for 15 minutes. The plasticizing effect of the acetamide was evident from the greater flow of the resin, when tested on a 140° C. hotplate, as compared with similar resins made without acetamide. The resinous syrup was tested for its curing characteristics by treating small samples of it with various curing agents and heating the resulting mixture on a 140° C. hotplate. Glycine, sulfamic acid, chloroacetamide and phenacyl chloride were used as curing agents. In all cases these agents caused the syrupy condensation product to convert to a cured or insoluble and infusible state when heated at 140° C. Instead of these curing agents, other curing agents such as mentioned under Example 2 may be employed.

The resinous composition of this example may be used in the production of molding compositions, especially where it is desired to produce a molded article in thin cross-sections. It also may be employed as a modifier of less plastic resinous materials to improve their flow or plastic properties.

*Example 11*

| | Parts |
|---|---|
| Alpha, beta-bis-(4,6-diamino pyrimidyl-2 thio acetamido) ethane | 21.2 |
| Diethyl malonate | 8.0 |
| Aqueous formaldehyde (approx. 37.1% HCHO) | 40.5 |
| Aqueous ammonia (approx. 28% NH₃) | 1.5 |
| Sodium hydroxide solution (0.46 N) | 0.8 |
| Water | 25.0 | were heated together under reflux at the boiling temperature of the mass for 15 minutes. The syrupy condensation product thereby obtained is potentially heat-hardenable, as shown by the fact that when small samples of the syrup were treated with various curing agents, for example glycine, sulfamic acid, chloroacetamide, sodium chloroacetate, polysalicylide and others such as mentioned under Example 2, followed by heating on a 140° C. hotplate, the syrup was converted into an insoluble and infusible state. The resinous material of this example may be used in the production of molding compounds and as modifiers of other less plastic materials to improve their plasticity.

*Example 12*

| | Parts |
|---|---|
| Alpha, beta-bis-(4,6-diamino pyrimidyl-2 thio acetamido) ethane | 21.2 |
| Glycerine | 4.6 |
| Aqueous formaldehyde (approx. 37.1% HCHO) | 40.5 |
| Aqueous ammonia (approx. 28% NH₃) | 1.5 |
| Sodium hydroxide solution (0.46 N) | 0.8 |
| Water | 25.0 |

All of the above components were heated together under reflux at the boiling temperature of the mass for 15 minutes. The resin syrup then was dehydrated. The dehydrated resin was soluble in butyl alcohol, benzyl alcohol, ethylene glycol and other organic solvents. A sample of the hot, dehydrated liquid resin was applied to a glass plate, after which the coated plate was baked for several hours at 70° C. A hard, smooth, glossy, tightly adhering, transparent, water-resistant, baked film was formed on the plate. The resinous material of this example is especially suitable for use in the production of coating compositions. It also may be used as a modifier of other synthetic resins and, together with various curing agents such as mentioned under Example 2, in the production of molding compositions.

*Example 13*

| | Parts |
|---|---|
| Alpha, beta-bis-(4,6-diamino pyrimidyl-2 thio acetamido) ethane | 21.2 |
| Polyvinyl alcohol | 2.2 |
| Aqueous formaldehyde (approx. 37.1% HCHO) | 40.5 |
| Sodium hydroxide solution (0.46 N) | 0.8 |
| Water | 25.0 | were heated together under reflux at the boiling temperature of the mass, yielding a clear syrup. When this syrup (with or without a curing agent such as mentioned under Example 2) was applied to a glass plate, and the coated plate was baked for several hours at 70° C., baked films were formed on the plate that were opaque, mar proof, water resistant and tightly adherent to the glass surface. Sulfamic acid, glycine, chloroacetamide and other curing agents such as mentioned under Example 2, when incorporated either into the syrupy condensation product or into the dehydrated resin, followed by heating on a 140° C. hotplate, caused the resin to cure rapidly to an insoluble and infusible state. The resinous compositions of this example may be used in the production of coating compositions and molding compounds.

It will be understood, of course, by those skilled in the art that my invention is not limited to condensation products obtained by reaction of ingredients comprising an aldehyde and the specific diazinyl compound named in the above illustrative examples. Thus, instead of alpha, beta-bis-(4,6-diamino pyrimidyl-2 thio acetamido) ethane, any other bis-(diazinyl thio alkylamido) or bis-(diazinyl thio alkylthionoamido) derivative of the kind with which this invention is concerned may be employed. For instance, I may use the bis-(diamino pyrimidyl thio acetamido)-substituted aliphatic hydrocarbons, more particularly the bis-(diamino pyrimidyl thio acetamido) alkanes, e. g., alpha, beta-bis-(2,6-diamino pyrimidyl-4 thio acetamido) ethane, the bis-(diamino pyrimidyl thio acetamido) propanes, the bis-(diamino pyrimidyl thio acetothionoamido) propanes, etc.; the bis-(diamino pyrimidyl thio acetamido)-substituted aromatic hydrocarbons, e. g., the bis-(diamino pyrimidyl thio acetamido) benzenes, the bis-(diamino pyrimidyl thio acetothionoamido) benzenes, the bis-diamino pyrimidyl thioacetothionoamido) benzenes, the bis-(diamino pyrimidyl thio acetamido) toluenes, etc.; and others such as mentioned hereinbefore and in my copending application Serial No. 419,177 by way of illustration.

Instead of the aldehydes mentioned in the above illustrative examples, I may replace the aldehyde in whole or in part with an equivalent amount of an aldehyde-addition product, e. g., with a methylol urea such as monomethylol urea or dimethylol urea, or with a methylol aminotriazine such as a monomethylol aminotriazine (e. g., monomethylol melamine) or a polymethylol aminotriazine (e. g., di-, tri-, tetra-, penta- and hexa-methylol melamines), or with a methylol guanazole, e. g., dimethylol guanazole, and the like.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be employed are acetaldehyde, propionaldehyde, butyraldehyde, valeraldehyde, caproaldehyde, crotonaldehyde, methacrolein, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives of urea, thiourea, selenourea and iminourea, substituted ureas, selenoureas, thioureas and iminoureas (numerous examples of which are given in my copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines, etc. Particularly good results are obtained with active methylene-containing bodies such as the methylol ureas and the methylol melamines, specific examples of which have been given hereinbefore. Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydric reactant to the pyrimidine derivative may be varied over a wide range, but ordinarily the reactants are employed in an amount corresponding to at least one mol of the aldehyde, specifically formaldehyde, for each mol of the pyrimidine derivative. Thus, I may use, for example, from one to eight or ten mols of an aldehyde for each mol of pyrimidine derivative. When the aldehyde is available for reaction in the form of an alkylol derivative, more particularly a methylol derivative such, for instance, as dimethylol urea, hexamethylol melamine, etc., then higher amounts of such aldehyde-addition products are used, for instance, from 2 or 3 up to 15 or 20 or more mols of such alkylol derivatives for each mol of the pyrimidine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc., acylated ureas, more particularly halogenated acylated ureas of the kind described, for example, in my copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind herein described and an aldehyde, e. g., formaldehyde, I may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and under pressures of the order of 1,000 to 5,000 poulds or more per square inch.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

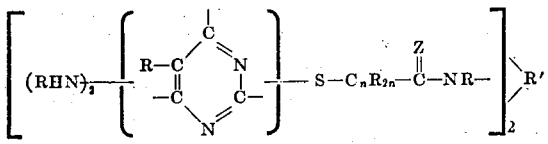

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

2. A composition as in claim 1 wherein the aldehyde is formaldehyde.

3. A composition as in claim 1 wherein the reaction product is the product obtained by effecting initial reaction between the specified components under alkaline conditions.

4. A composition of matter comprising the reaction product of ingredients comprising an aldehyde and a compound corresponding to the general formula

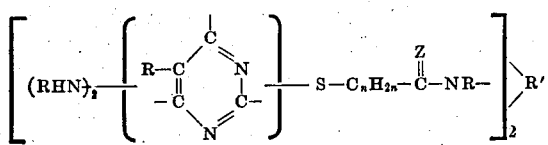

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

5. A heat-curable resinous composition comprising a heat-convertible condensation product of ingredients comprising formaldehyde and a compound corresponding to the general formula

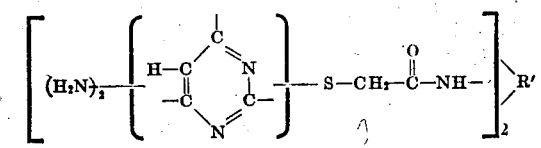

where R' represents a member of the class consisting of divalent hydrocarbon and halo-hydrocarbon radicals.

6. A product comprising the heat-cured resinous composition of claim 5.

7. A resinous composition comprising the product of reaction of ingredients comprising an aldehyde and a bis-(diamino pyrimidyl thio acetamido)-substituted aliphatic hydrocarbon.

8. A resinous composition comprising the product of reaction of ingredients comprising an aldehyde and a bis-(diamino pyrimidyl thio acetamido) alkane.

9. A composition comprising the resinous product of reaction of ingredients comprising formaldehyde and alpha, beta-bis-(4,6-diamino pyrimidyl-2 thio acetamido) ethane.

10. A composition comprising the product of reaction of ingredients comprising an aldehyde and a bis-(diamino pyrimidyl thio acetamido)-substituted aromatic hydrocarbon.

11. A composition comprising the product of reaction of ingredients comprising a urea, an aldehyde and a compound corresponding to the general formula

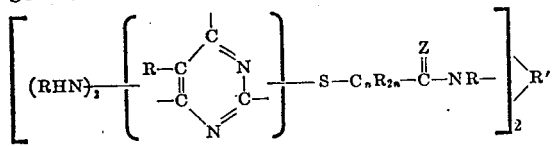

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

12. A composition as in claim 11 wherein the urea component is the compound corresponding to the formula $NH_2CONH_2$ and the aldehyde is formaldehyde.

13. A heat-curable composition comprising the heat-convertible resinous reaction product of (1) a partial condensation product of ingredients comprising formaldehyde and a compound corresponding to the general formula

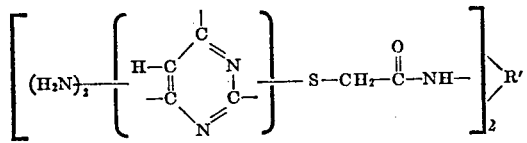

where R' represents a divalent hydrocarbon radical, and (2) a curing reactant.

14. A resinous composition as in claim 13 wherein the curing reactant is a chlorinated acetamide.

15. A composition comprising the product of reaction of ingredients comprising urea, formaldehyde and an alpha, beta-bis-(diamino pyrimidyl thio acetamido) ethane.

16. A composition comprising the product of reaction of ingredients comprising dimethylol urea and an alpha, beta-bis-(diamino pyrimidyl thio acetamido) ethane.

17. A composition comprising the product of reaction of ingredients comprising melamine formaldehyde and an alpha, beta-bis-(diamino pyrimidyl thio acetamido) ethane.

18. A composition comprising the product of reaction of ingredients comprising a polymethylol aminotriazine and an alpha, beta-bis-(diamino pyrimidyl thio acetamido) ethane.

19. A resinous composition comprising the product of reaction of (1) a partial condensation product of ingredients comprising urea, formaldehyde and alpha, beta-bis-(4,6-diamino pyrimidyl-2 thio acetamido) ethane, and (2) a chlorinated acetamide.

20. The method of preparing new condensation products which comprises effecting reaction between ingredients comprising an aldehyde and a compound corresponding to the general formula

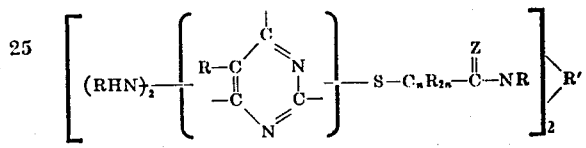

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

GAETANO F. D'ALELIO.

CERTIFICATE OF CORRECTION.

Patent No. 2,321,364.  June 8, 1943.

GAETANO F. D'ALELIO.

It is hereby certified that error appears in the printed specification of the above numbered patent requiring correction as follows: Page 2, first column, line 33, for "acetothionamido" read --acetothionoamido--; line 37, for "diamino-pyrimidyl" read --diamino pyrimidyl--; line 61, after "noamido" insert a closing parenthesis; and second column, line 3, strike out the hyphen after "thio"; lines 9 and 73, for "betha-thio" read --beta-thio--; line 10, for "propanamido (ethanes" read --propanamido) ethanes--; lines 22 and 24, for "beta thio" read --beta-thio--; page 3, first column, line 5, for "undertsood" read --understood--; page 4, first column, line 41, for "HSHO" read --HCHO--; page 5, second column, line 1, for the syllable "peratures" read --perature--; page 7, first column, line 52, for "bis-diamino" read --bis-(diamino--; page 8, first column, line 45, for "poulds" read --pounds--; page 9, second column, line 6, after "melamine" insert a comma; line 24-29, in the formula, for "-NR" read -- -NR- --; and that the said Letters Patent should be read with this correction therein that the same may conform to the record of the case in the Patent Office.

Signed and sealed this 20th day of July, A. D. 1943.

Henry Van Arsdale,
Acting Commissioner of Patents.

(Seal)